United States Patent [19]

Budke et al.

[11] 4,114,494

[45] Sep. 19, 1978

[54] NOISE-CONTROLLED CIRCULAR SAW BLADE

[76] Inventors: Robert L. Budke, 10542 - 12th Ave. NW., Seattle, Wash. 98177; Lowell C. Freeborn, 6040 Redwing St., Seattle, Wash. 98118

[21] Appl. No.: 866,636

[22] Filed: Jan. 3, 1978

Related U.S. Application Data

[63] Continuation of Ser. No. 657,361, Feb. 12, 1976, abandoned.

[51] Int. Cl.² .................................................. B27B 33/08
[52] U.S. Cl. ........................................ 83/835; 83/839; 83/854; 83/855
[58] Field of Search ................... 83/835, 839, 854, 855

[56] References Cited

U.S. PATENT DOCUMENTS

| 1,837,344 | 12/1931 | Stauder | 83/835 |
| 3,261,384 | 7/1966 | Henderson | 83/839 |
| 3,358,720 | 12/1967 | Henderson | 83/855 |
| 3,878,747 | 4/1975 | Soderstrom | 83/835 |
| 3,938,417 | 2/1976 | Nedsten | 83/835 |

Primary Examiner—Donald R. Schran
Attorney, Agent, or Firm—Seed, Berry, Vernon & Baynham

[57] ABSTRACT

A circular saw is disclosed which employs unique tooth forms contributing to reduced noise. The saw in operation, because of the design of the tooth forms, reduces vibration of the saw plate caused by air turbulence as well as reduces air flow through the gullet of the saw blade. The overall result is a quieter saw. A narrow, shallow and generally square design gullet configuration contributes to noise reduction.

2 Claims, 6 Drawing Figures

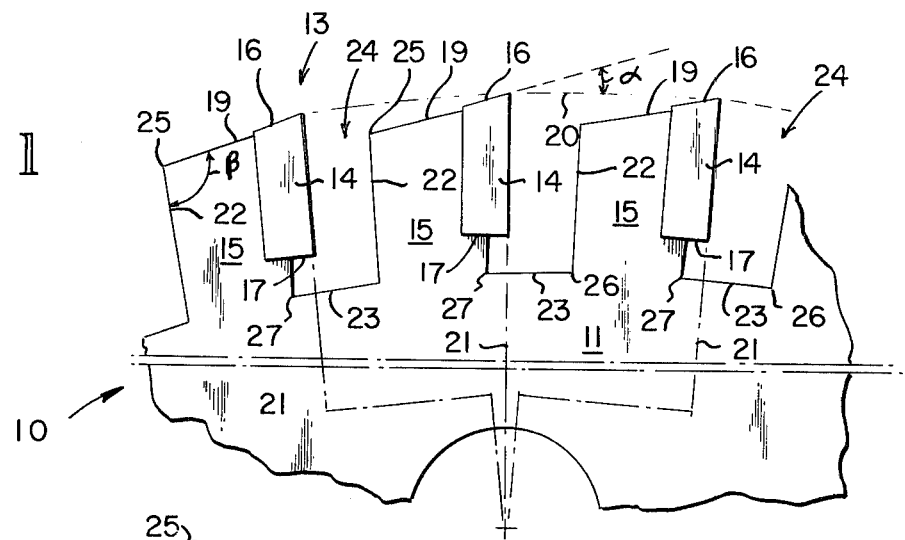
FIG. 1
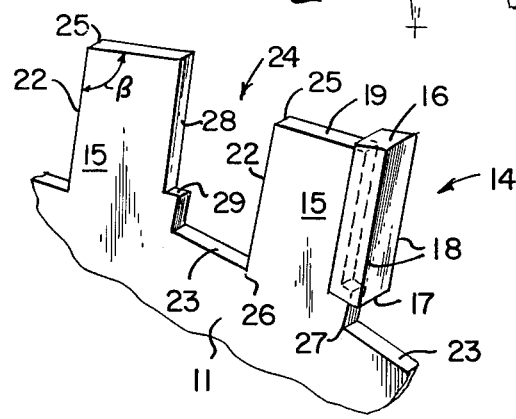
FIG. 2
FIG. 3
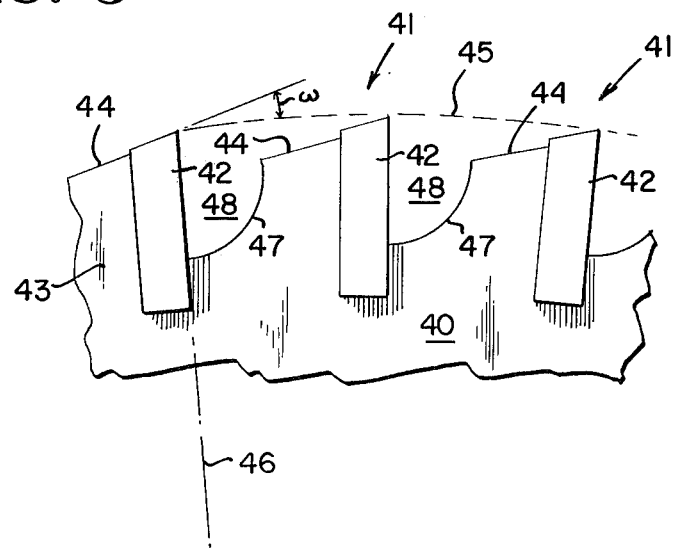

NOISE-CONTROLLED CIRCULAR SAW BLADE

This is a continuation of application Ser. No. 657,361, filed Feb. 12, 1976 now abandoned.

BACKGROUND OF THE INVENTION

1. Field of the Invention

This invention relates to a noise-controlled circular saw blade.

2. Prior Art Relating to the Disclosure

Circular saw blades have generally been designed with primary regard to cutting ability, performance and blade life with little or no regard for the noise created by the blade when in operation. With the increasing knowledge about the detrimental effects of high noise levels on working personnel, laws and regulations are being implemented to control and reduce noise levels. In mills where sawing is carried out, the noise levels are generally at a high level. The noise level can be controlled in a number of ways, such as requiring the workers to wear noise protectors. No real effort, however, has been put into developing saw blades having reduced noise levels.

Circular saws in predominant use today have gullets which are wide, deep and of generally round construction. They also generally include curved shoulders behind the teeth. Saw noise is generated from many sources — the saw blades, the saw enclosure, saw guards, etc. The saw blades themselves generate two distinctly different types of noise — free spinning noise and cutting noise. The free spinning noise is a combination of (1) air noise and (2) saw plate vibration. Most of the free spinning noise is air generated with this air generated noise then picked up and amplified by vibration in the saw plate.

Through experimentation it has been found that the conventional tooth and gullet shapes are the principal cause of free spinning saw noise. Knowing this, it has remained a problem to design tooth forms which reduce the noise level of a free spinning circular saw blade to acceptable levels.

SUMMARY OF THE INVENTION

It is a principal object of this invention to provide a circular saw which, when free spinning, is quieter than conventional circular saws employing conventional rounded gullets.

It is a further object of this invention to provide a circular saw having a unique gullet design which creates less air turbulence and, therefore, creates less saw plate vibration.

It is a further object of this invention to provide a circular saw blade having carbide cutting teeth disposed about the periphery of the saw blade with gullets circumferentially distributed about the periphery of the saw plate between the cutting teeth, each of the gullets being shallow and of generally square design with the openings leading to the gullets being as narrow as practical.

It is a further object of this invention to provide a circular saw blade employing a tooth form which, because of its shape, produces a stronger saw plate rim which is less subject to vibration.

It is a further object of this invention to provide a circular saw blade which runs quieter when spinning freely, the outer surface of the saw plate having a different metal laminated or electroplated thereto to provide vibration and resonance damping characteristics.

These and other objects are accomplished by a circular saw blade including a circular plate having a concentric mounted opening and a predetermined direction of operational rotation, cutting teeth disposed about the periphery of the plate, the teeth including tips mounted on the saw plate having cutting edges, gullets circumferentially distributed about the periphery of the saw plate between the cutting teeth, each gullet having first and second edges extending inwardly in a radial direction toward the axis of the saw plate and forming the rearward and forward edges of the gullet respectively, relative to the direction of saw rotation, the forward edge intersecting with a terminal edge of the saw plate rearward of the preceeding cutting tooth at an obtuse angle having a distinct vertex.

BRIEF DESCRIPTION OF THE DRAWINGS

FIG. 1 is a side view of a segment of a circular blade having a gullet configuration contributing to less noise;

FIG. 2 is a perspective view of the blade of FIG. 1;

FIG. 3 is a side view of a segment of a circular blade having reduced free spinning noise, the blade designed for fine cutting;

DETAILED DESCRIPTION OF THE INVENTION

Figure 4:
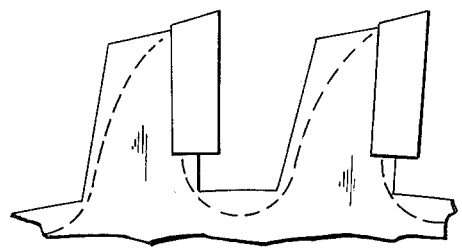
FIG. 4 illustrates the gullet configuration of a circular blade described herein in contrast to the gullet configuration of a conventional circular-saw blade.

Referring to FIG. 1, a portion of a circular saw blade is indicated at 10. The saw blade includes a circular saw plate 11 with an eye at the center thereof for mounting the saw on an arbor. Teeth 13 are distributed about the periphery of the saw plate. The teeth include cutting tips 14 of carbide or other suitable hard material which are supported by and brazed to portions 15 integral with the saw plate. Each cutting tip 14 includes a top 16 disposed radially outwardly of the saw, a base 17 which is radially inward of the top and side cutting edges 18 which extend laterally from opposite faces of the saw plate. Each portion 15 has a terminating edge 19 extending rearwardly of the tip 14 at an acute angle alpha measured with respect to a plane 20, extending perpendicular to a radial line 21 projected from the center of the saw plate. The closer surface 19 is to plane 20 the less the noise of the blade. It is preferable to terminate surface 19 below plane 20 enough to provide clearance relative to the cutting tips 14. The angle alpha is relatively small, generally 12° or less so that there is a substantial portion of the saw plate supporting the backs of the cutting tips 14. Edge 19 merges with forward edge 22. Edge 23 defines the base of the gullet which should be no deeper than necessary for adequate cutting action. For example, with a 12 inch diameter blade, the gullet depth measured from the radial line 20 inwardly is about 0.25 inches. Deep gullets trap air during blade rotation and make the blade noisier. The angle of the cutting tips relative to radial line 21 may vary according to the cutting angle required for various materials.

Edge 19 intersects edge 22 to form an obtuse angle beta having a distinct vertex 25. In FIG. 1, surface 22 is parallel to surface 28. A generally rectangular configuration gullet is formed. In contrast, gullets of conventional saws have gentle curves of a rounded or circular shape with curved shoulders behind each of the teeth as illustrated by dotted lines in FIG. 4. This has been found to create a siren effect producing a great deal of noise. To reduce that noise, it has been found that an abrupt obtuse angle back of the cutting teeth and the generally square or rectangular configuration gullet 24 produces a great deal less noise. To reduce noise the gullet openings are made as narrow as possible while providing sufficient capacity for chips generated during a sawing operation by the cutting action of the saw teeth. The intersection 26 of edge 22 and edge 23 forms an abrupt obtuse angle having a distinct vertex. Edge 28, which forms the support for the cutting tip 14, extends radially inwardly the approximate depth of the cutting tip to form a shoulder 29 and then extends into intersection with edge 23 at essentially a right angle 27. The square configuration of the gullets 24, while not affecting the performance of the saw blade, does markedly affect the noise level of the free spinning blade because of less air turbulence and less saw plate vibration. In general, the more parallel edges 22 and 28 are, the less the free spinning noise of the saw plate.

FIG. 3 illustrates a modification of the tooth form of a saw blade designed for cutting delicate materials such as thin aluminum sections and thin sections of other materials, such as plastics, wood and other non-ferrous metals. Referring to FIG. 3, a portion of a circular saw plate is indicated by reference numeral 40. The plate includes an eye (not shown) at the center for mounting the saw plate on an arbor. Teeth 41 are distributed about the periphery of the saw plate. The teeth may include cutting tips 42 of carbide or other suitable hard material which are supported by and brazed to portions 43 integral with the saw plate. The cutting tips 42 have the same configuration as the cutting tips 14 of FIG. 1. Each portion 43 has a terminating edge 44 extending rearwardly of the tip of the cutting tips 42 that defines an acute angle omega with respect to a plane 45 extending perpendicular to a radial line 46 projected from the center of the saw plate. The angle omega is relatively small, generally 12° or less so that there is a substantial portion of the saw plate supporting the backs of the saw tips 42. Edge 44 intersects curved edge 47 at an obtuse angle having a distinct vertex. Edge 47 defines the forward edge and base of gullet 48 of generally crescent shape, the gullet having a depth substantially less than the length of the cutting tips 42. The lower portion of each of the cutting tips is recessed radially into the saw plate a distance equal to about one-third the length of the cutting tip. The gullet is made as shallow as possible while still retaining sufficient chip capacity to make the blade operable.

Either of the blades illustrated in FIG. 1 and FIG. 2 may be further provided with noise reduction characteristics by laminating another metal, such as copper or lead, to the saw plate on both sides thereof to provide vibration and resonance damping characteristics. The copper or lead may be adhesively bonded to the saw plate or electroplated to the saw plate surfaces.

The following example is illustrative of the noise levels of conventional saw blades and of those having the designs illustrated in FIGS. 1 and 3.

EXAMPLE I

Comparative noise level readings were obtained at various rpm levels using a saw blade having a conventional gullet configuration as illustrated by dotted lines in FIG. 4 and a saw blade having a square gullet configuration as illustrated in FIGS. 1, 2 and 4. The saw blades were of the same diameter, had the same number of teeth and the same type of carbide tip. Only the gullet configuration differed. The conventional blade had rounded gullets with a depth of about 5/16 inch measured inwardly from a plane disposed perpendicular to a radial line projected from the center of a saw plate. The gullet had a radius of 3/64 inch with the leading edge of the gullet disposed at an angle relative to a plane disposed perpendicular to a radial line projected from the center of the saw plate about 60°. The terminating edge of the saw plate extending rearwardly from the cutting tip extended at an angle relative to a plane disposed perpendicular to a radial line projected from the center of the saw plate of about 20°. The cutting tip had a hook angle of about 11°.

The saw plate having a square gullet as illustrated in FIGS. 1 and 2 also had 60 teeth, and was of the same diameter. The depth of the gullet relative to a plane disposed perpendicular to a radial line projected from the center of the saw plate was 2.25 inches. The angle alpha was 15° and the angle beta 10°. The hook angle of the cutting tips was 10°.

Figure 5:
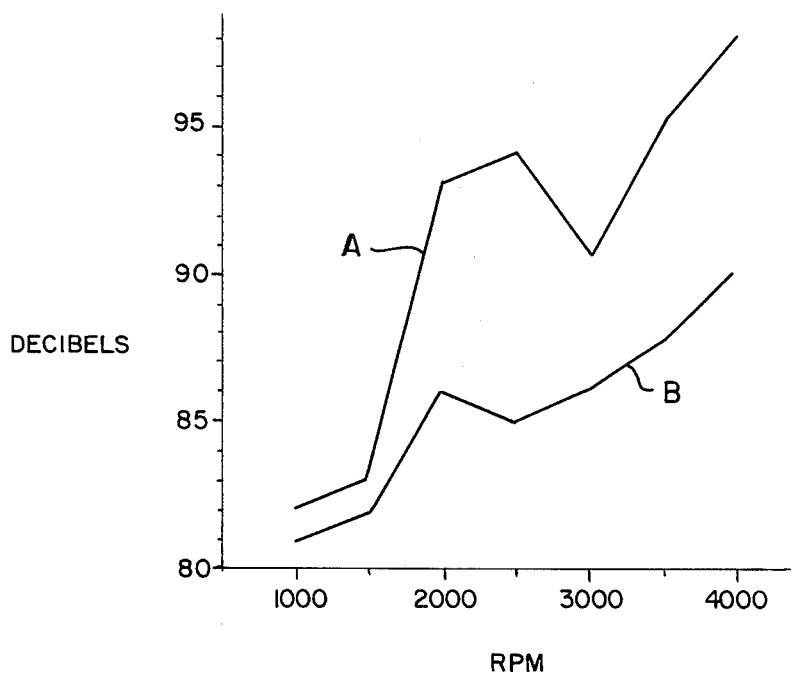
FIGS. 5 and 6 are comparative graphs of decibels v. rpm of the free spinning noise of circular saw blades having the gullet configuration of FIGS. 1 and 2 (A) compared to circular saw blades having a conventional gullet configuration as illustrated in dotted lines in FIG. 4 (B).
Figure 6:
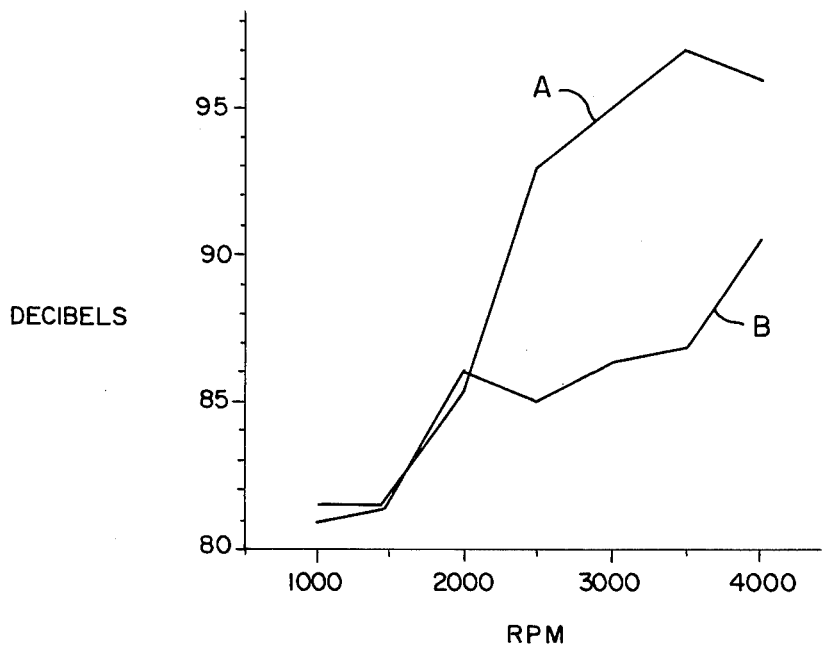

FIGS. 5 and 6 illustrate the comparative noise levels of the saw blades of the above designs. In FIG. 5, the saw blades, both the conventional and the blade of this invention, employed a top bevel cutting tip while the saw blades of FIG. 6 employed cutting tips where a first flat top tooth was followed by a second flat top tooth with both corners relieved, leaving approximately ⅓ of the second flat top remaining. The noise level generated at the various rpm levels was measured with a decibel meter for each of the saws. The reference "B" indicates the saw blade of this invention while the reference "A" represents a circular saw blade of conventional gullet design as illustrated in dotted lines in FIG. 4. As can be seen, the noise level of blades employing the square gullet configuration is considerably less than the noise level of blades having conventional rounded gullets.

The embodiments of the invention in which a particular property or privilege is claimed are defined as follows:

1. A rotary saw blade having reduced saw plate vibration and air noise when spinning comprising:
a circular saw plate having a central opening with respect to its axis and a predetermined direction of operational rotation,
cutting teeth disposed about the periphery of the saw plate,
gullets circumferentially distributed about the periphery of the saw plate between the cutting teeth, each of the gullets having (1) spaced apart first and second straight edges forming, respectively, the rearward and forward edges of the gullet relative to the direction of saw rotation and extending inwardly toward the axis of the saw plate a depth adequate for cutting action, (2) a third straight edge forming the base edge of each gullet intersecting the rearward edge at its inward end at essentially a right angle and the forward edge thereof at its inward end at an obtuse angle having distinct vertex, a terminal edge of the saw plate extending rearwardly of each cutting tooth at an acute angle substantially less than 90° measured with respect to a plane connecting the outer terminating edges of the cutting teeth and perpendicular to a radial line projected from the axis of the saw plate, the terminal edge intersecting the forward edge of each gullet at its upper end rearward of the cutting tooth at an obtuse angle having a distinct vertex, the intersecting edges of the terminal edge and forward edge forming a heel portion of the saw plate giving support for the preceding cutting tooth, and cutting tips adhered to each cutting tooth, each cutting tip extending inwardly along the rearward straight edge of the gullet less than the depth of the gullet having lateral cutting edges protruding beyond each of the opposite faces of the saw plate and a top cutting edge extending beyond the terminating edge of the saw plate.

2. A rotary saw blade having reduced saw plate vibration and air noise when spinning comprising:

a circular saw plate having a central opening with respect to its axis and a predetermined direction of operational rotation, cutting teeth disposed about the periphery of the plate, gullets circumferentially distributed about the periphery of the saw plate between the cutting teeth, each of the gullets having (1) parallel spaced apart first and second straight edges forming, respectively, the rearward and forward edges of the gullet relative to the direction of saw rotation and extending inwardly toward the axis of the saw plate a depth adequate for cutting action, (2) a third straight edge forming the base edge of each gullet intersecting the rearward edge at its inner end at essentially a right angle and intersecting the forward edge at its inner end at essentially a right angle, a terminal edge of the saw plate extending rearwardly of each cutting tooth at an acute angle substantially less than 90° measured with respect to a plane connecting the outer terminating edges of the cutting teeth and parallel to a radial line projected from the axis of the saw plate, the terminal edge intersecting the forward edge of each gullet at its upper end rearward of the cutting tooth at an obtuse angle having a distinct vertex, the intersecting edges of the terminal edge of the saw plate and forward edge of the gullet forming a heel portion giving support for the preceding cutting tooth, and cutting tips adhered to each of the cutting teeth along the rearward straight edge of the gullet thereof extending inwardly less than the depth of the gullet and having lateral cutting edges projecting beyond each of the opposite faces of the saw plate and a top cutting edge extending beyond the terminating edge of the saw plate.

* * * * *